United States Patent
Guenkova-Luy et al.

(10) Patent No.: US 9,201,844 B2
(45) Date of Patent: Dec. 1, 2015

(54) TELEMATICS SYSTEM

(71) Applicant: Harman Becker Automotive Systems GmbH, Karlsbad (DE)

(72) Inventors: Teodora Guenkova-Luy, Ulm-Grimmelfingen (DE); Ralph Goeckelmann, Dornstadt (DE); Martin Clauss, Ummendorf (DE); Andreas Klimke, Ulm-Soflingen (DE); Oliver Abt, Blaustein (DE); Felix Seibold, Ulm-Jungingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 13 days.

(21) Appl. No.: 13/924,973

(22) Filed: Jun. 24, 2013

(65) Prior Publication Data

US 2014/0005880 A1 Jan. 2, 2014

(30) Foreign Application Priority Data

Jun. 28, 2012 (EP) .................................... 12004834

(51) Int. Cl.
| | |
|---|---|
| *G06F 17/00* | (2006.01) |
| *H04L 29/08* | (2006.01) |
| *H04L 12/24* | (2006.01) |
| *G07C 5/00* | (2006.01) |
| *G07C 5/08* | (2006.01) |

(52) U.S. Cl.
CPC .............. *G06F 17/00* (2013.01); *H04L 41/069* (2013.01); *H04L 67/12* (2013.01); *G07C 5/008* (2013.01); *G07C 5/0808* (2013.01)

(58) Field of Classification Search
CPC ........ G07C 5/008; G07C 5/085; G06Q 10/08; G06Q 10/00; G06F 17/30038; G06F 17/30053; G06F 17/30058; G08G 1/127; H04L 12/589; H04L 51/38; H04N 21/4122; H04N 21/4126; H04N 21/42204; H04N 21/4227; H04N 21/43615; H04N 21/4751; H04N 21/4753; H04N 21/632; H04W 24/08; H04W 4/12
USPC ........ 701/1, 22, 29, 33; 725/80; 370/253, 328
See application file for complete search history.

(56) References Cited

U.S. PATENT DOCUMENTS

| | | | |
|---|---|---|---|
| 8,544,046 B2 * | 9/2013 | Gran et al. ...................... 725/80 |
| 2005/0060070 A1 * | 3/2005 | Kapolka et al. ................. 701/29 |
| 2005/0065678 A1 * | 3/2005 | Smith et al. ..................... 701/29 |
| 2005/0203673 A1 * | 9/2005 | El-Hajj et al. .................... 701/1 |
| 2009/0150023 A1 | 6/2009 | Grau et al. |

(Continued)

OTHER PUBLICATIONS

Proemion Telematics System, Telematics Machine Park & Fleet Management Remote Diagnostics, 3pp. date unknown.

(Continued)

*Primary Examiner* — James Trammell
*Assistant Examiner* — Sanjeev Malhotra
(74) *Attorney, Agent, or Firm* — Alleman Hall McCoy Russell & Tuttle LLP

(57) ABSTRACT

A telematics system can include a processor, installed in a vehicle, ship, or other mode of transport of people, configured to identify an error state of an telematics component providing a telematics service. The processor can also be configured to communicate the error state to a logger component via a logging message. The logger component may be configured to generate a log file based on the logging message.

12 Claims, 5 Drawing Sheets

(56) References Cited

U.S. PATENT DOCUMENTS

| | | | |
|---|---|---|---|
| 2010/0254282 A1* | 10/2010 | Chan et al. | 370/253 |
| 2011/0130906 A1* | 6/2011 | Mayer | 701/22 |
| 2011/0130916 A1* | 6/2011 | Mayer | 701/33 |
| 2011/0141974 A1* | 6/2011 | Lieberman | 370/328 |
| 2011/0276218 A1 | 11/2011 | Dwan et al. | |
| 2011/0276219 A1 | 11/2011 | Swaminathan et al. | |
| 2012/0053778 A1 | 3/2012 | Colvin et al. | |

OTHER PUBLICATIONS

Detlef Borchers, Mit WLAN im Verbund auf der Autobahn, URL:http://www.heise.de/newsticker/meldung/Mit-WLAN-im-Verbund-auf-der-Autobahn-995443.html?view=print, 1 page, May 7, 2010.

John Quinn, Setting up Syslog for Distributed Application Logging, URL:http://www.johnandcailin.com/blog/john/setting-sysloo-distributed-application-logging, 1 page, Oct. 9, 2007.

Syslog, Wikipedia URL:http://en.wikipedia.org/w/index.php?title=Syslog&oldid-490814502, May 5, 2012.

Lee et al., A Telematics Service System Based on the Linux Cluster, Computational Science a ICCS 2007; [Lecture Notes in Computer Science;; LNCS], Springer Berlin Heidelberg, Berlin, pp. 660-667. May 27, 2007.

Gerhards Adiscon GmbH R: The Syslog Protocol; rfc5424.TXT, Internet Engineering Task Force, IETF; Standard, Internet Society (ISOC) 4, Rue Des Falaises CH-1205 Geneva, Switzerland, Mar. 1, 2009.

Chuah et al., Diagnosing the Root-Causes of Failures from Cluster Log Files, High Performance Computing (HIPC), 2010 International Conference on IEEE, pp. 1-10, Dec. 19, 2010.

International Search Report from corresponding European Patent Application No. EP12 00 4834, dated Oct. 19, 2012.

* cited by examiner

TELEMATICS SYSTEM

PRIORITY CLAIM

This application claims the benefit of priority from European Patent Application No. 12004834.3, filed Jun. 28, 2012, which is incorporated by reference.

BACKGROUND OF THE INVENTION

1. Technical Field

The present invention relates to a method and an apparatus for logging and diagnostics of telematics systems.

2. Related Art

Since its introduction in 1978 by Simon Nora and Alain Minc, telematics, e.g., the integration of telecommunications and informatics, has become very popular, especially in the context of automotive telematics, e.g., for application in vehicles. Applications of automotive telematics systems include automotive navigation systems using Global Positioning System technology, emergency warning systems for vehicles, both in vehicle-to-vehicle and in vehicle-to-infrastructure settings, emergency calling systems in the case of accident or breakdown of the vehicle, integrated hands-free cell phones, wireless safety communications, automatic driving assistance systems, mobile data, radio, and television, and vehicle tracking, e.g., as part of fleet management systems.

SUMMARY

A system, such as a telematics system, can include a processing unit, a logger component, a telematics component, and an application component. The processing unit, the logger component, the telematics component, and the application component can be configured to be installed in a vehicle, ship, or other mode of transport of people. The logger component, the telematics component, and the application component can be executed by the processing unit to provide a service of the telematics component and communicate errors occurring in the application component. The errors can be communicated via a logging message to the logger component. The logger component can be executed by the processing unit to generate a log file based on the logging message.

In another example, a system, such as a telematics system, can include a processor that can be configured to be installed in a vehicle, ship, or other mode of transport of people. The processor can also be configured to identify predefined use cases associated with an application component of a telematics system. Further, the processor can be configured to identify a logging message from a log file associated with the application component and identify a use case from the predefined use cases by matching the logging message to an error component of the use case.

In yet another example, a system, such as a telematics system, can include a processor that can be configured to be installed in a vehicle, ship, or other mode of transport of people. The processor can also be configured to identify errors in a telematics component providing a telematics service. Further, the processor can be configured to communicate the errors to a logger component via a logging message. The logger component can be configured to generate a log file based on the logging message.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
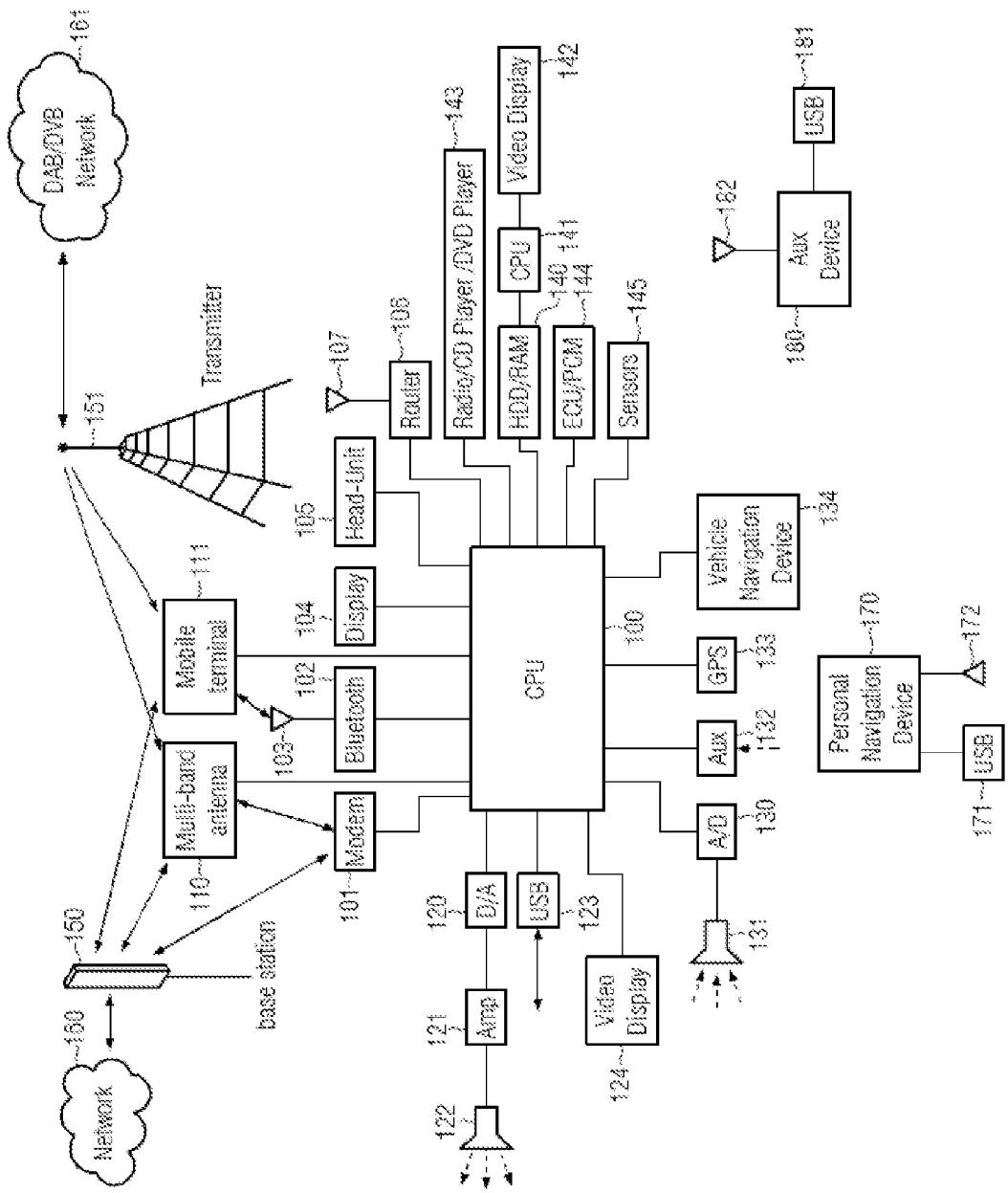
FIG. 1 shows an example of an automotive telematics system.

Telematics systems may include electronic, electromechanical, and electromagnetic devices. Intelligent vehicle technologies may be utilized for safety and commercial communications between vehicles or between a vehicle and an external sensor or an external server. Such systems may also be provided for other modes of transportation of people, including aircraft and ships.

A telematics system can include systems for logging and diagnosing telematics systems. The systems may include combining features from a real-time tracing methodology including persistent error storage and diagnostics, where the system being logged and analyzed may be composed of an arbitrary number of sub-components that exhibit significant inter-dependency.

The system may include on-board logging and on-board diagnostics systems for vehicles, ships, or other modes of transport of people, interacting with telematics components of the vehicles, ships, or other modes of transport of people. One example system may employ an 'on-board diagnostics system' in order to detect problems with components of the vehicle early on. The detected problems may be reported to the driver. In addition, they may be recorded for later analysis by a specialist using diagnostic trouble codes (DTCs). This allows the service provider to more rapidly identify the cause of a problem once a vehicle has been returned for inspection. A scan tool may be used to read the diagnostics information memory. The scan tool may be physically connected to the on-board diagnostics system.

Tracking of a system state of a complex product, like an automotive telematics system, combined with the ability of detecting problematic behavior as early on as possible may be helpful in preventing vehicle accidents as well as ensuring a (near) problem-free product life cycle. Malfunctions of safety relevant telematics components, as for instance for the automatic dispatching of an emergency call in the case of an accident or break-down of the vehicle or for the exchange of information concerning hazardous road conditions between vehicles and/or back-end servers, may be detected as early as possible or ideally be anticipated by constant monitoring of the involved telematics components and/or (software) application components.

System processes and activities may be carried out by or in interaction with (software and/or hardware) application components in the automotive environment and may be composed of a large number of sub-tasks executed by sub-components that interact with each other. In many cases, the combined behavior of the sub-systems must be taken into account in order to correctly identify the root cause of an error in the case of a malfunction of a system. Furthermore, processes often exhibit volatile behavior in case of errors, e.g., system problems may recover by themselves due to a change of the external conditions. Examples for such systems may be online and connectivity systems, which may fail under conditions of no network coverage but recover as soon as network coverage is reached.

An automated diagnostics tool may to be able to take these characteristics into account in order to avoid inconclusive results. In a volatile system, it may be desirable to extract the relevant errors that have occurred and to provide information on the overall system reliability and performance (for instance, the number of successfully completed use cases vs. failed ones). Since many errors in complex systems involving application components and telematics components may not be safety relevant and may additionally be volatile, it may be desirable to decouple servicing of the telematics system from the standard vehicle inspection cycle. A servicing of the telematics system driven by demand, ideally prior to customer complaints, may be in the interest of both customers and service providers.

Further, the increasing complexity and interconnectivity of telematics systems in current vehicles may have led to an even larger quantity of possible errors, root causes, and error messages, which may exceed the capabilities of on-board diagnostics systems and trained diagnosticians, who, in many cases, have to diagnose occurred problems 'by hand' by running diagnostics tests as part of a vehicle service. Standardized error codes or diagnostic trouble codes can help but often hamper technological progress in a highly competitive environment. Considering the rather long product life cycle of vehicles, as opposed for instance to smart phones, and the limited capabilities for system upgrades of deployed telematics systems, an extensible logging and diagnostics system may be desirable.

The technical problems described herein may be solved by a telematics system, including: an automotive telematics component; at least one processing unit; at least one application component providing a service of the telematics component, where the at least one application component may be implemented in the at least one processing unit and adapted to transmit its state in the form of a logging message to a logger component; and the logger component implemented in a processing unit and adapted to receive the logging message from the at least one application component and to generate a log file based on the received logging message.

As described, a telematics system may be based on telecommunications and informatics and can include a large number of telematics components of which some or all may interact with each other to provide a number of services to a user or other systems or system components. A telematics system may be an automotive telematics system, e.g., a telematics system deployed in a vehicle such as a car, a truck, an aircraft, a train, or a ship.

The telematics system includes at least one automotive telematics component, but may include an arbitrary number of automotive telematics components with an arbitrary level of inter-connectivity. Herein, automotive telematics components may be hardware components installed in a vehicle but may also include software application components implemented in a single or multiple processing units. Automotive telematics components may be chosen from the group including a car head-unit, a car radio, a car sound system, including one or more speakers, amplifiers, and D/A converters, a microphone system, including one or more microphones and A/D converters, a vehicle navigation device, a GPS (Global Positioning System) device, one or several auxiliary input devices, like a touch screen, a mouse, a control stick, a trackball, or the like, one or several sensors, like pressure sensors, road condition sensors, parking sensors, light sensors, and the like, any electronic control unit (ECU) implementing the previously mentioned or other functionalities, a powertrain control module (PCM), one or several storage media, like a hard disk drive (HDD), an optical storage device, a RAM memory, and the like, a CD and/or DVD player, a wireless router, a WiFi transceiver, one or more USB connectors, a Bluetooth transceiver with a Bluetooth antenna, one or more auxiliary devices with a USB connector and/or a (Bluetooth) transceiver, a modem (e.g., GSM, GPRS, UMTS, etc., wireless connectivity modem), a multi-band antenna, a satellite antenna, a mobile terminal, like a mobile phone, smartphone, PDA, tablet computer, notebook, or similar. Inter-component interconnections like the automotive networks CAN, MOST, etc., or interconnection technologies like Ethernet or USB may also play an important role at realization of telematics functionalities within the vehicle.

The automotive telematics component provides one or several services to the user and/or another component of the telematics system. The service may be provided to the user and/or the other component through at least one application component of the telematics system. The application component may be provided by electronic circuitry or may be implemented as a software application component stored in a memory device and executable by a processing unit. The application component may be a real-time application component, in a sense the execution of the application component by the processing unit happens in synchronization with a time scale predefined by other components of the vehicle. As an example, updating the display of a navigation system usually happens in synchronization with the movement of the vehicle and detected changes of the vehicle's GPS position. The processing unit may be any kind of electronic processing device, a CPU or GPU as used in embedded systems, and the implementation may be in the form of a set of computer-executable instructions or program code. The instruction set or program code for implementing and/or running the application component on the processing unit may be stored in a volatile or non-volatile memory and/or storage device and may be configured when installed in the telematics system, customized by a user, and/or updated via external input to the telematics system. A user here and in the following means a driver, passenger, or mechanic or other specialist. The processing unit and/or the memory and/or storage device may be part of a central telematics control unit (TCU) or may be part of an automotive telematics component.

Services of telematics components provided by an application component include services from the group of infotainment, such as hands-free telephony, navigation, audio services, like AM/FM radio, Digital Audio Broadcast (DAB) radio, In-Band On-Channel (IBOC) digital radio, and satellite radio, video services, like DVD playback, HDD playback, Digital Video Broadcast (DVB) video services, 3GPP mobile video services, and the like, web access, email service, traffic information services, and Human-Machine-Interaction (HMI) services like on-board games and vehicle information services or any other app-like services requiring vehicle-to-infrastructure communication, as well as services related to road and vehicle safety, such as automatic emergency calls (E-Calls), automatic breakdown calls (B-Calls), automatic service calls (S-Calls), On-Board Diagnostics, e.g., according to EOBD (European On-Board Diagnostics) or OBD-II (On-Board Diagnostics-II) regulations, Engine Control services, security services, e.g., connected to the car locking system, as well as vehicle-to-vehicle and vehicle-to-infrastructure warnings. The service may be provided by a single application component for a single or several telematics components, where the telematics components may interact with each other and/or the application component. An application component may request a service from a telematics component like the dispatching of an emergency call via a Bluetooth connector, and the telematics component, in this case the Bluetooth connector, will provide the requested service in interaction with other telematics components, for instance a Bluetooth antenna and a mobile terminal. The service may also be provided by multiple application components for a single or several telematics components.

Here and in the following, providing a service of a telematics component by an application component means that the application component provides the service through the software and/or hardware telematics component. The application component may dispatch service requests in the form of control signals to the telematics component, receive state information from the telematics component, and send and/or receive data to/from the telematics component. The telematics component may further rely on another telematics component to provide the requested service and may therefore interact with the other telematics component in a similar way as the application component interacts with the telematics component in the first place. Similarly, the application component may rely on another application component to provide the service and may therefore interact with the other application component in a similar way as the application component in the first place. In such a way, chains of multiple telematics components and/or multiple application components may be formed to provide a service. Within such a chain, each component, be it an application component or a telematics component, may feed messages, signals and data through to the next component in the chain, potentially after processing them. However, an application component may also interact with multiple telematics components in order to provide a single service as well as multiple application components may interact with a single telematics component to provide a single or multiple services. In addition to linear chains of components, tree-like chains of components may be possible. In such a case, messages, signals, and data may be dispatched to the next component or next components in the tree based on predetermined criteria of the corresponding component. Ultimately, each chain may have at least one component that acts as a 'controller' for the entire chain and provides the service to the user or another telematics component.

The at least one application component providing a service of the telematics component may determine its state, and then transmits its state in the form of a logging message to a logger component. A state here and in the following denotes the condition, which the component may be in, with respect to the provided service, or a part of the service, which may be to be provided by the component. Conditions may include 'active', 'idle', and 'failed' but also much more conditions like 'failed to download file because of broken pipe', 'stalled since 5 minutes', 'not enough battery power', 'forbidden on Radio-Clamp=OFF, allowed only on Ignition', 'Currently No-Network Condition', and the like, depending on the service, the component and its relationships to other components. In short, determining the state of a component forms the basis for providing a descriptive logging message with respect to a service or functionality and therefore involves corresponding checks and status flags of the corresponding component. With respect to checking for errors by an automatic fault root cause analysis, a state may include an error state of the component, e.g., a particular state, which the component may be in after the occurrence of a particular error. The application component may determine its state as a result of the execution of the corresponding instructions or program code by the processing unit and/or based on state information received from another application component and/or telematics component, from components in a chain of components corresponding to the provided service. When determining its state based on received state information, the application component may apply predefined rules to process the received state information. Part of these rules may be decision trees for determining whether a reported error, received as state information, may be critical, non-critical, or irrelevant. Also, error reports contained in the state information may refer to hardware failures, of the involved telematics component(s), and/or software malfunctions, e.g., of the involved application component(s). An error may be regarded as critical if the service cannot be provided once the error has occurred. An error may be regarded as non-critical if the service can still be provided once the error has occurred, but for instance at a slower speed than intended, and it may be regarded as irrelevant if it neither affects the successful provision of the service nor the quality of the service, for instance by connecting to a different telecommunications provider than requested if no extra charges or delays may be incurred by that.

The logger component may be implemented in the same processing unit as the at least one application component or in a different processing unit. The logger component may be implemented in a central processing unit while the at least one application component may be implemented in a processing unit which may be assigned to or integrated in the automotive telematics component. The logger component may receive the logging message from the at least one application component either directly, if both the logger component and the at least one application component may be implemented in the same processing unit or via a wired or wireless connection, e.g., via a CAN, MOST, or IEEE 1394 bus. The logger component may generate the log file based on the received logging message by simply creating the log file and writing the corresponding data structure of the logging message to the created log file or by appending the corresponding logging message to an existing log file. The logger component may further write logging messages to different log files depending on the application component from which they were received. The logger component may include a file management component or even a database.

The described system provides ad hoc on-board logging capabilities of complex automotive systems without any special equipment. By logging malfunctions of (software) application components providing a service, more frequent software errors (as compared to hardware errors) may be detected in an efficient way. Indirectly, based on the signals generated in the software also defects in the hardware may be identified in certain cases where the state of the hardware may be interpreted for the faultless functionality of the respective software telematics component. Since the logger component may continuously protocol the success or failure of an application component, volatile behaviour, such as the one triggered by the dependency on network coverage, may also be captured and diagnosed, which may be difficult with some diagnostics systems employing standard system checks and being carried out once on start-up of the vehicle or during inspection of the vehicle. The generated log file accumulates relevant logging information in a compact and centralized way and may be post-processed easily to diagnose potential problems of the system. The generated log file also serves as documentation, even with respect to legal aspects, e.g., when determining why a crucial system such an emergency call dispatcher has failed. The inherent occurrence ordering of events corresponding to the logging messages stored in a log file significantly improve the chances of determining a fault root cause as compared to the dependency filtering for DTCs.

In one or more examples, the logging message may include: a component identifier for the at least one application component; a message identifier describing the transmitted state of the at least one application component; and metadata including at least one parameter.

The logging messages may be generated by the at least one application component in a predefined, coded, possibly binary, format, including the data fields. The goal of a predefined logging format may be to transport relevant information while minimizing the amount of data. The presented approach may use codes in association with parameters and descriptions in a similar way as DTC (Diagnostic Trouble Codes) protocol codes do, but the format of the presented logging protocol may be different from the DTC format. The codes may later be translated into readable text. The logging messages that may be transmitted by an application component may be predefined, e.g., by the provider of the corresponding application component, and may be uniquely identified by a component identifier and a message identifier or signal identified, where the message/signal identifier describes the transmitted state of the application component. Each logging message may further include metadata, such one or more parameters. In order to obtain a well-defined sequence of messages, each logging message may further include a timestamp. A possible standard frame format may include a timestamp, component identification, a message or signal identification, and metadata.

Note that the signal ID may already carry meta-information about the originating component, e.g., the application component or automotive telematics component. In some cases, this information might be sufficient to identify and analyze the use case. In terms of a protocol, the signal ID may indicate a system event or a protocol message that the application component generates, e.g., the successful connection to a mobile network. In terms of a programming language, the signal ID may be associated with the execution of a method that triggers an event or a sequence of events within the respective software system, e.g., the involved chain of application components. The component ID indicates the application component or telematics component initiating the signal, e.g., a network controller. Combining the two identifiers, the component ID and the signal ID uniquely identify an event in the system.

In some examples, the logger component may further be adapted to convert the received logging message into a packed binary format when generating the log file. The logger component may be continuously receiving logging messages, generated and transmitted from one or more application components, related to one or more provided service, in an arbitrary order. From the received logging messages, the logger component may generate a list of packed binary data blocks, each including the data fields (component ID, message ID, metadata, and possibly timestamp). The logger component may order the received logging messages chronologically based on their timestamps, if available, or may order them (additionally) by their component ID, respectively by the corresponding provided service. The logger component may then write the packed binary data blocks either one by one or in blocks, e.g., as a list, to one or several log files. In doing so, the logger component may also manage the log files and may maintain separate log files for each application component or each provided service via the pre-sorting. By maintaining separate log files for each service, e.g., a dedicated log file for hands-free telephony, it may be easier for a later diagnostics, either automatic or manual, to access and analyze the relevant log files.

In order to allow for a later analysis of the generated log files, the system according to some examples, may further include: a memory for storing the generated log file; and a reporter component implemented in a processing unit and adapted to read the previously stored log file from the memory and to transmit it to an analyzer component implemented in a processing unit.

The memory may be any kind of memory, but may be realized by a persistent storage device, such as a hard disk drive or an optical storage device. A circular data structure (circular buffer) may be used to store the logging data. The amount of logged data may be limited to a predetermined time period, which can be, however, configurable in accordance with the processing and storage capabilities of the telematics system. In the case of application to a car telematics system, this period may be equal to the power cycles of the past few weeks. Larger log periods may be achieved by transferring the circular data buffer periodically or on demand to a back-end (provider) server for analysis, which may leverage the flexibility of computers with higher storage and processing capacity. The back-end server may be part of the claimed (automotive) system.

The reporter component may be implemented in the same processing unit as the logger component or in a different processing unit. During the recording of the log files, the system's reporter component provides the possibility to package the recorded binary log files as problem reports. These problem reports may contain the log files recorded by the logger and selected by the reporter component, e.g., based on a vehicle identification number (VIN) as well as the type of problem report. However, the reporter component may also simply transmit problem reports including the bare log files to an analyzer component. Creation and/or transmission of a problem report may be triggered either manually (e.g., by user or diagnostician) or automatically (either by applications onboard or from back-end side). The trigger may be sent to the reporter component from a remote back-end (provider) server, from the analyzer component, through an existing network and corresponding components of the telematics system. Depending on the type of trigger, additional information may be added to the problem report (e.g., a list of connected mobile devices, IP-channel diagnostics, etc.) by the reporter component. Remote analysis of a received problem report may include unique identification of the on-board telematics system as well as of its associated reports, so that the reports coming from an on-board system may be uniquely differentiated and sorted at the receiver back-end server for the purpose of long-term storage.

The analyzer component may be implemented in an external processing unit, for example as part of a back-end server, e.g., the vehicle. However, the analysis, especially a reduced version of it, may also be performed by an internal processing unit that may be part of the on-board part of the telematics system. In this case, the analyzer component may be implemented in an internal processing unit, e.g., the same processing unit that the reporter component may be implemented. An external processing unit may be part of a back-end (provider) server that interacts with the telematics system via wireless communication or transfer of USB storage devices. The server may further be part of a portable electronic device, like a laptop computer, tablet computer, or similar. It may be in the form of a standalone system or may be provided as a distributed network, e.g., with connected servers at registered car dealers. The server may not be limited by inherent constraints of an automotive telematics system, like space, cost, redundancy, reliability, storage and computing capacity, and so on, which may transmit a log file by the reporter component of a telematics system to an external analyzer component that allows for a much more detailed and faster analysis and diagnostics of potentially occurred problems of the telematics system.

In one or more examples, the analyzer component may be implemented in an external processing unit, included in a provider server further including an off-board storage memory, or may be an on-board analyzer component.

An on-board analyzer component may be implemented in an on-board processing unit, in the same processing unit that the reporter component may be implemented. In the latter case, transmission of the log file from the reporter component to the analyzer component may be carried out in memory, in a volatile memory of the processing unit. The (external) provider server may include an off-board storage memory, in the form of a hard disk drive or optical storage device.

In one or more examples, the reporter component may be configured to receive a trigger signal and/or dictionary-decoding data for on-board analysis from the provider server. The trigger may be sent to the reporter component from a remote back-end (provider) server. The dictionary-decoding data may be used by an on-board analyzer component to convert a logging message from a binary format into human-readable text.

In one or more examples, the reporter component may further be adapted to transmit the previously stored log file to the analyzer component by means of a wireless communication module of the telematics system. The wireless communication module may be a wireless router with a corresponding short-distance antenna, a modem, which communicates with a local area network (LAN) or a mobile communications network, a Bluetooth transceiver with a corresponding antenna, a mobile telecommunication device, either fixedly installed in the vehicle or connected to the vehicle as a mobile terminal, or any other communication module. The connection between the wireless communication module of the telematics system and a wireless communication module of a remote system, including the analyzer component, may be established directly, e.g., by establishing a server-client connection in a local area network, or via an existing network, e.g., a telecommunications network.

The packaged problem report or log file may be dispatched by the reporter component to a messaging component that provides mechanisms for downloading and uploading data to a back-end infrastructure. This messaging component may be part of an already existing telematics infrastructure on-board the vehicular system. Using this messaging component, the reporter component may transmit the problem report/log file to a back-end (provider) server based on a configuration of a vehicle configuration management component. The vehicle configuration management component may also be part of the present telematics infrastructure and may provide information on where to transmit the problem reports and which retry strategies to follow. In case transmission of a problem report is unsuccessful despite any retries, the report or corresponding log file may be stored persistently on-board the vehicle in a persistent storage device of the telematics system, and transmission may be attempted again as soon as outline conditions indicate a potentially successful environment. In this respect, the reporter component may automatically detect available communication infrastructure on-board the vehicle and outside the vehicle and scan for a potentially successful data-transmission environment.

Unlike other approaches, special equipment may not be necessary to log and to read the logging data. Logging files may be transferred over the existing communication infrastructure inside and outside the vehicle and be analyzed without the necessity of the customer delivering his vehicle to a service provider. Due to the immediate or timely transmission of packaged log files to back-end servers, the transmitted problem reports become available for analysis and customer complaints may be anticipated early on. The transmission of the problem reports may occur over any built-in or customer communication infrastructure associated with the vehicle upon availability and the transfer may be secured over the provided means of the employed communication protocols.

In one or more examples, the reporter component may further be adapted to transmit the previously stored log file to the analyzer component after a predetermined time, preferably 2-3 days, and the analyzer component may be configured to store the transmitted log file. The predetermined time may be (re-)configured by a user either by direct interaction with the telematics system of the vehicle or remotely via the back-end server. Configuring the reporter component to transmit log files, which have accumulated since a previous transmission, in regular time intervals, allows for accumulating data related to a continuous performance of the telematics system at the back-end side. Such data may be transmitted and accumulated independently for correcting errors in the system and serve to assess the overall quality of the telematics system, its components, and/or the services provided by the telematics system. As an alternative, the reporter component may be configured to transmit log files stored in the on-board memory or storage device, e.g., a circular buffer, whenever a memory overflow becomes imminent. By such a configuration, possible loss of logging data may be avoided. The reporter component may further be configured to delete log files that have been transmitted from the on-board memory. The reporter component may also be configured to transmit those log files which contain logging messages reporting a problem or an error of a predetermined type, e.g., critical or non-critical, or related to a telematics component or service.

The analyzer component may be configured to store the transmitted log file in a memory, such as in an external memory, e.g., outside the vehicle, in the case of an off-board analyzer component, such an external memory may be part of a back-end server system, including the external processing unit implementing the analyzer component. The memory may be any storage device, such as a persistent storage device like a hard disk drive or optical storage. Depending on a user determined configuration, the analyzer component may systematically collect log files from one or multiple vehicles, pre-sort them by detected vehicle IDs, detected type of the problem report, detected type of the provided service, and the like, and store them in a database for future analysis. Such an analysis may be triggered automatically, e.g., based on the relevance of a detected problem, or by a user, e.g., a mechanic. Detected problems related to vehicle and driver safety for instance may automatically be analyzed while detected problems of the infotainment system of the vehicle may be postponed until a specialist may be assigned to them. The analyzer component may also be configured to collect log files of an application component, e.g., a sporadically malfunctioning mobile telecommunications device, in order to be able to perform a statistical analysis.

For the described system, small and efficient components with respect to the processing unit and the on-board memory may be employed if the most recent time of on-board activity, e.g., 2-3 days of activity, may be logged. However, it may also be possible to create ad hoc off-board logging memory so that the on-board memory may be extended based on usage of exported diagnostics logs on a back-end infrastructure.

In one or more examples, the analyzer component may be further adapted to carry out an automatic fault root cause analysis by automatically analyzing the transmitted log file based on at least one predefined use case. A fault root cause analysis tries to identify one or several root causes of a problem rather than trying to remedy the immediate symptoms of the problem. As an example, a root cause for a failed download from the web may be that the telematics system fails to connect to a network because the network is out of reach or because the remote server, which should provide the data for download, is down, while the symptom—stalled download—may be indecisive with respect to the root cause. The system and method allows for identifying the actual root cause or root causes of an occurring problem in a telematics system by providing logging information from relevant involved components, application components and telematics components alike, ideally from components of the corresponding chain providing a service, where the component ID and signal ID included in each logging message allows for uniquely assigning each logging message to a component and an occurred event. By analyzing the transmitted log file and its included logging messages, the analyzer component may ultimately determine the fault root cause(s) of a diagnosed problem and provide valuable information to a specialist, who may then use this information to correct the telematics system. The fault root cause analysis may follow any rules of root cause analysis, but may be a failure-based root cause analysis.

Since the logging messages may be generated based on the events and use cases within a system, explicit dependencies between occurring errors may be generated in the log file. Therefore, the log file allows for a more descriptive and accurate approach compared to the dependency filtering for DTCs. The knowledge of possible events and use cases allows for an automatic analysis of system errors and dependencies of errors by parsing the log files generated by the system.

The analyzer component may carry out an automatic fault root cause analysis by automatically analyzing the transmitted log file based on at least one predefined use case. A use case may be a list of steps, defining interactions between a role, e.g., a user or an application component providing a service, and a system, e.g., an automotive telematics system, in order to achieve a goal, e.g., to provide a service of the telematics system. The use case may be predefined by a specialist, the manufacturer of a telematics component or the provider of an application component. Since a different event produces a new use case, each service and its corresponding application component may have a plurality of use cases, just as each application component and/or telematics component may have a plurality of states and produce a plurality of different logging messages. Also, the analyzer component can dispose of a large number of predefined use cases which may be stored in an external memory, e.g., outside the vehicle, or in an on-board memory in the case of an on-board analyzer component, e.g., in the form of a database. The list of predefined use cases, however, may not be complete with respect to covering possible events that might occur when providing a service by an application component. In case the analyzer component fails to identify a matching use case, a corresponding failure message may be produced by the analyzer component and a matching use case may be defined by a specialist and added to the list of predefined use cases based on an analysis report of the analyzer component. According to the system, use cases may be predefined that establish relationships between message IDs and metadata of logging messages in a meaningful way, e.g., based on actual event-based situations.

In one or more examples, the analyzer component may further be adapted to analyze the transmitted log file by: reading a plurality of predefined use cases from a memory; extracting at least one logging message from the transmitted log file; and identifying the at least one predefined use case from the plurality of predefined use cases by matching the at least one extracted logging message to at least one state of the at least one predefined use case; where the at least one predefined use case may be defined as a plurality of states and relationships presented in a state flow diagram.

The use cases in the plurality of predefined use cases may be defined and later represented by the help of a graphical program and then be translated into a format that may be parsed, such as XML. Each use case may be defined as a state flow diagram including START, EVENT, and END states. Each state represents one log signal (1:1 assignment), where a log signal includes at least a component ID and a message/signal ID. Each state may further include at least one state parameter which may be set according to or matched with the at least one parameter contained in the metadata of a logging message. A START state may be the first log signal belonging to a use case, and may trigger the start of a use case (entry point). The END state marks the end of the use case (exit point). A use case can have both multiple entry and multiple exit points. Between the START and END states, an arbitrary number of intermediary states (EVENT states) may be assumed. The states may be connected by directed edges to indicate the sequence of the states in terms of relations. A use case can therefore be described as a directed graph that may contain loops. A more detailed description of the definition of a use case as a state flow diagram. Using a graphical program to define and/or represent a use case vastly simplifies the process of configuring and using the automatic analysis system provided by the analyzer component and based on the system. Use cases may be simply defined by selecting and connecting states from a pool of predefined states. Results of a fault root cause analysis may be visually presented by means of a graphical representation of the corresponding use case as a state flow diagram and may be readily diagnosed by an expert.

As before, the memory may be any persistent storage, e.g., a hard disk drive or an optical storage device. In the case of an off-board analyzer component, both the processing unit implementing the analyzer component and the memory may be part of a back-end (provider) server. The analyzer component reads a plurality of predefined use cases from the memory, where the reading of a use case may be carried out one state at a time, according to a preliminary result of the analysis of the transmitted log file. As an example, the analyzer component may read the START state of predefined use cases related to an application/telematics component of the telematics system according to a component ID of the first logging message in the analyzed log file. By analyzing a further logging message in the log file, the analyzer component may then select among the group of use cases selected in the first step, which use cases may be compatible with the component ID, signal ID, and/or metadata contained in the further logging message, which identify at least one predefined use case from the plurality of predefined use cases by successively matching logging messages extracted from the transmitted log file to successive states of predefined use cases, which may narrow an initial group of candidate predefined use cases down to at least one predefined use case. Failure to identify at least one predefined use case may be reported by the analyzer component. Alternatively to the sequential reading of a predefined use case, the analyzer component may also read use cases entirely and then process them step-by-step while analyzing the transmitted log file.

To analyze a transmitted log file, the analyzer component extracts logging messages from the transmitted log file, one-by-one. However, the analyzer may also extract logging messages contained in the log file at once and then proceed to analyze them. As part of the extracting, the analyzer component may de-compress binary data that has been packed by the logger component of the telematics system. The analyzer may also carry out a fault root cause analysis by extracting logging messages from a log file and assigning each extracted logging message to those use cases that reference the data of the logging message, which may select a set of relevant use cases before carrying out a detailed analysis by sequentially stepping through a use case from the selected set and matching the extracted logging messages to the states of that use case.

In addition to the 1:1 assignment of one log signal to one state in a use case definition, logging messages may be distinguished by their metadata and assigned multiple different states depending on the values of the at least one parameter included in the metadata. The parameters contained in the metadata may be evaluated by the analyzer component based on the criteria defined in Table 1. If parameters match the definitions provided with the use case state, the logging message may be considered part of the use case.

TABLE 1

Criteria for message assignment based on parameter values

| Criterion | Meaning |
| --- | --- |
| * | Parameter value is irrelevant |
| x | Parameter must have exactly the provided value x |
| [x, y] | Parameter must be within the provided numeric range [x, y] |
| $VARIABLE_NAME | Parameter must be equal to the content of the variable $VARIABLE_NAME |

Here, the values x and y as well as the VARIABLE_NAME may be part of the definition of the use case.

Groups of EVENT states may be reorganized into sub-use cases. In this way, a decomposition of a use case into logical blocks or tasks may be achieved. This allows better modeling of use cases that involve multiple components. It also permits re-use of common state flow patterns from multiple main use cases or intermediary sub-use cases (sub-use case nesting— possibly over multiple levels).

In one or more examples of the system, the at least one processing unit of the telematics system may include a multi-threaded system capable of executing concurrent instances of the at least one application component at the same time, the at least one state of the at least one predefined use case may include at least one use case variable, and the analyzer component may further be adapted to identify an instance of the identified predefined use case by matching the at least one parameter included in the metadata of the at least one logging message to the at least one use case variable. Here, a multi-threaded system denotes any system which may be capable of executing multiple instances of the at least one application component at the same time, e.g., multi-core processing units, hyper-threaded processing units, or any multi-tasking capable processing unit. In such cases, multiple concurrent instances of the at least one application component may be spawned or scheduled at the same time. Concurrent instances of the at least one application component may be executed on the same processing unit or different processing units. They may represent executions of identical program codes, however, on different parametric data. As an example, a download client may be run multiple times to download different files or to access different networks, and such parametric data may be included in a logging message through the use of parameters in the metadata of the logging message.

It may be useful to explicitly allow or disallow running multiple concurrent instances of an application component in a telematics system, since multiple occurrences of logging messages of the same use case could indicate either normal or problematic system behavior. For instance, a single voice phone connection should be allowed at a time, while multiple concurrent data connections would be perfectly valid. To indicate that a use case can run simultaneously multiple times, a corresponding qualifier may be set for each use case. Furthermore, to correctly track the use cases that run in parallel, a novel variables tracking feature may be used.

In the case of multi-instance use cases, a challenge may be to determine which instance of a use case may be associated with a logging message. Two concurrent instances of an application component will transmit logging messages in an unpredictable interleaved way to the logger component depending on their starting times and other system parameters. The log file generated by the logger component may therefore contain a sequence of logging messages that either belong to the first instance or the second instance but do not follow an order. When dealing with multiple concurrent instances, multiple possibly matching log signals may be available, but the message parameter can resolve which use case instance a signal belongs. For example, multiple download queues may be active that issue the same starting signal for the download process, but differ in a single parameter, such as a queue identifier. Another example may be a sub-use case that uses a parameter as an identifier, e.g., a download ID, to track the messages that belong to it, that may be in turn referenced by one or multiple parent use cases.

This challenge may be addressed in example systems by using use case variables that can hold message metadata values. A use case definition can declare variables through statements like $VARIABLE_NAME=<Default Value>. A START, EVENT, or END state can then assign a value to these variables through assignment statements based on the at least one parameter included in the metadata of a logging message, which has been matched to the corresponding state, or on a further variable during use case analysis. The variables may be passed on from one state to the next. The analyzer component may then use a defined variable as a criterion to assign a logging message to an instance of a predefined use case, based on a comparison of the defined variable and the at least one parameter of the metadata of the logging message. A reserved variable may be introduced with name $RETURN. It may be used to assign metadata content inside a sub-use case for further processing by its caller, e.g., parent use case, upon ending the sub-use case, similarly to return parameters in C functions.

In various examples, an accurate separation of multiple concurrent use case instances may be possible through tracking of IDs that are contained in the logging message metadata. As one non-limiting example, if multiple files are downloaded at the same time, it may be afterwards possible to correctly track which file download caused a problem. This includes the possibility of tracking which sub-use cases (such as opening a data connection, requesting net access permission from a service level agreement manager, and so on) belong to the download use case instance.

The analyzer component may further be adapted to automatically create a summary report for each analyzed log file. The report may provide the time window of the recorded events, as well as the number of system power cycles. The report may further contain an overview table of use cases identified from the log file. The end state of each use case may be reported along with the status flag indicating success, error, or warning states. Based on the summary report for a use case, a specialist may decide to determine a success rate of the corresponding service and take further measures, for instance calling the vehicle in for servicing or initiating a more detailed logging of the problematic application component(s) and/or telematics component(s).

The automatically generated summary file containing use cases corresponding to the analyzed log file permits a rapid assessment of the log file. If few use cases have failed execution, these may be easily found by an expert, including the exact end state or last executed message. Furthermore, the complete trace of that failed use case may be immediately available for further analysis, separated from other messages which may have occurred at the same time but do not belong to the use case. This provides a significant advantage over conventional trace analysis, where the trace must be manually filtered afterwards for the problematic use case. It also provides a significant advantage over flagging DTCs, where little or no additional information is available as to which sequence of system conditions lead to the decision to generate the recorded trouble code.

The summary reports provide the possibility to quickly gather accumulated information on warnings and errors with respect to a provided service, including their occurrence count. Since the log files may contain more than just errors, namely use cases that were actually executed (during a recorded time frame), the summary reports may be used to gather more detailed information about user behavior, preferred use cases, use case success rates, etc.

In an alternative, the analyzer component may be implemented on-board the vehicle and the reporter component may transmit the log file to the analyzer component via existing infrastructure of the vehicle, e.g., wires, Bluetooth antenna, wireless antenna, or the like. The analyzer component may be implemented in the same processing unit as the reporter component, and transmitting the log file to the analyzer component may occur inside a memory, e.g., RAM, of the processing component. The analyzer component on-board may be configured to carry out a lightweight analysis of the log file according to the system and method. In addition to such a lightweight analysis, the log file may also be transmitted to an external processing unit implementing a full version of the analyzer component which may be configured to carry out the complete analysis according to the system and method. A lightweight report may be made available directly on-board employing a suitable output device (such as a browser or text editor displayed on a graphical display).

A telematics system including both an on-board analyzer component and a remote analyzer component may provide suggestions to the user, e.g., the driver, on how to fix an occurring problem in the system, based on a combination of a remote analysis and the on-board lightweight analysis. When a problem with a monitored (logged) service is noticed, either by the user or the on-board analyzer component, the user (driver) or the service personnel, at a dealer station or not, may request an analysis by the back-end (provider) server by transmitting the corresponding log file. Basic information on the type of problem may be included in the request as part of the problem report. The remote analyzer component of the back-end server may carry out a full analysis of the log file and prepare decoding data for the affected vehicle. The remote analyzer component may further send a trigger signal for transfer of this decoding data to the vehicle, especially to the on-board reporter component. The preparation of the decoding data may involve a human specialist, e.g., a mechanic, but may also be based on the automatic full analysis process, e.g., the analysis summary.

The trigger may be received in the vehicle by SMS, IP, or other online connection. In response to this trigger, the reporter component may fetch the decoding data from the back-end server. The vehicle may be identified, e.g., by its VIN, time of error occurrence, etc. The decoding data may already include information on how to fix predetermined problems.

On receiving the decoding data, the local logging data included in the transmitted log file may be subjected to a lightweight analysis by the on-board analyzer component and presented to the user (or service personnel) directly in the vehicle as a human-readable problem report, for instance, as a Web page in the vehicle's browser. The user may then initiate the correction of the problem based on the lightweight analysis and the received decoding data. Alternatively, the on-board analyzer component may attempt to fix the problem automatically, e.g., by installing software patches provided with the received decoding data.

In one or more examples, the at least one application component may further be adapted to transmit its state to the logger component upon reception of a predefined trigger signal from the logger component. In one example, determination and transmission of the state of an application component or telematics component may be triggered by the component itself, e.g., based on a configuration of the component upon detection of events, like malfunctions of the component, or by the logger component. A trigger by the logger component may be direct by requesting transmission of the current state of a component, e.g., idle, or indirect via manipulation of the configuration of the corresponding component. The logger component may for instance change a time interval during which, or a time period after which a component transmits its state. It may also activate the transmission of states from a component that normally would not transmit its state. The additional transmission of states may be limited to a time period, e.g., a time of each day, for which a user has experienced problems with the corresponding service. Which triggers to send may be determined by the logger component based on trigger configuration data received from the back-end server and processed by the reporter component. By this means, a specialist may be able to re-configure the logging system to provide more detailed logging reports for a service and/or during a specified time interval. By enabling the logging system to adapt its level of detail based on configuration data received from the back-end server, the standard (e.g., without extra detail) log files and problem reports may be kept slim such that an on-board memory for storing the log files may be kept small and energy efficient. Also, an application component may trigger a more detailed logging process upon detection of predefined errors.

In one or more examples, the analyzer component may further be adapted to convert the extracted at least one logging message into human-readable text by application of a predefined multi-level dictionary. A two-level description scheme may be used as the predefined multi-level dictionary in order to translate the binary logging messages into human-readable text. A top-level file may define global message filters and import the lower level, component-definition files. Importing component-files has the advantage of being able to maintain component translation files separately according to whether the corresponding components are involved in the provision of a service or not. The translation may work with a partial set of translation (definition) files in order to speed up the translation process by omitting the processing of data that may be predetermined to be irrelevant for analyzing a problem. Moreover, message filters may be used to classify recorded signals according to their meaning (e.g., as an information, a warning, or a fatal error message). This approach takes a modular application into account where translation files are per component and may be maintained independently. A top-level description file may be used to avoid any conflicts between coexisting components.

In various examples, a method for logging for telematics systems may include: transmitting at least one state of at least one application component providing a service of a telematics component and implemented in a processing unit to a logger component in the form of a logging message; receiving the logging message by the logger component; and generating a log file based on the received logging message.

The log file may be generated by the logger component based on the received logging message. The same variants and/or extensions of the telematics system with respect to logging, analyzing, and/or diagnosing the system behaviour may also apply to the method for logging for telematics systems. The logging may be carried out ad hoc, continuously, or periodically.

The logging message may include: a component identifier for the at least one application component; a message identifier describing the transmitted at least one state of the at least one application component; and metadata including at least one parameter; and where the logging message includes a timestamp.

The cited identifiers and metadata may be specified and employed by the method according to the variants and rules.

In one or more examples, the method may further include: storing the generated log file in a memory; reading the previously stored log file from the memory and transmitting it to an analyzer component implemented in a processing unit; and carrying out an automatic fault root cause analysis by automatically analyzing the transmitted log file based on at least one predefined use case.

The analyzer component may be implemented in an external processing unit, as part of a back-end (provider) server or a lightweight analyzer component may alternatively or additionally be implemented in an on-board processing unit. Again, the same variants and extensions of transmitting the log file and carrying out an automatic fault root cause analysis may apply.

In one or more examples, the method may further include: reading a plurality of predefined use cases from a memory; extracting at least one logging message from the transmitted log file; identifying the at least one predefined use case from the plurality of predefined use cases by matching the at least one extracted logging message to at least one state of the at least one predefined use case; where the at least one predefined use case may be defined as a plurality of states and relationships presented in a state flow diagram; obtaining analysis data on the identified at least one predefined use case; and displaying the analysis data in human-readable format.

Equivalent modifications and extensions with respect to use case definitions and matching of logging messages with use cases may be applied. Also, identification of an instance of the identified predefined use case by matching at least one parameter included in the metadata of the at least one extracted logging message according to any of the variants may be included in the method. The obtained analysis data may include at least one logging message indicative of an occurred problem, e.g., from an application/telematics component having reported an error. The human-readable format may be generated from the analysis data by application of a multi-level dictionary. It may further be generated based on a graphical representation of a state flow diagram corresponding to the identified at least one predefined use case.

The described apparatus and method allow for a lightweight and yet feature-rich logging and provide a suitable tool for a statistical analysis of usage and early detection of non-critical field errors as well as preliminary information on individual errors that might lead to customer complaints, further allowing the systems to help improve the customer experience in the long run.

An example automotive telematics system is illustrated with respect to FIG. 1. It shall be understood that the described components are merely intended as non-limiting examples of automotive telematics components, where some components may be omitted or replaced by other telematics components.

Components 100 to 145 and 170 to 182 may be installed in a vehicle, while components 150 to 161 are external components that are not part of the automotive telematics system but may interact with some of the telematics components of the vehicle.

A vehicle equipped with a telematics system may contain a display 104 as a visual front-end interface located in the vehicle. The user may also be able to interact with the interface via a touch sensitive screen, via pressing a button, via audible speech and speech synthesis, or other HMI (Human-Machine-Interaction) components. Interaction via audible speech and speech synthesis or analysis may be via a microphone 131 and an A/D converter 130 for receiving input from the user and via a D/A converter 120, an amplifier 121, and one or several speakers 122 for giving output to the user. The visual front end interface may be part of a head-unit for a centralized interaction of the user with the telematics system or separate from one or more dedicated head-units 105, e.g., for interaction of the user with audio or telephony components of the telematics system.

In the illustrative shown in FIG. 1, a central processing unit 100, a CPU or GPU or an embedded system, controls at least a portion of the operation of the telematics system. However, the system is not limited to this, but may provide at least one further processing unit assigned to a telematics component or a group of telematics components, as for instance a CPU 141 provided with a video display 142, possibly as part of a rear seat entertainment system for displaying movies from a storage device, like a hard disk drive 140. The processing unit allows on-board processing of instructions, commands, and routines, as part of an application component of the telematics system. The processing unit 100 may further be connected to both non-persistent and persistent storage devices 140. The non-persistent storage device may be random access memory (RAM) and the persistent storage device may be a hard disk drive (HDD) or flash memory.

The processing unit 100 may also be provided with a number of different inputs allowing the user to interface with the processing unit. A microphone 131, an auxiliary input 132, a USB input 123, a GPS input 133, and a Bluetooth input 102 may be provided. An input selector may be provided to allow the user to swap between various inputs. Input to the microphone 131 may be converted from analog to digital by an A/D converter 130 before being passed to the processing unit.

Outputs from the telematics system may include a video display 124 and a speaker 122 or stereo/surround system output. The speaker may be connected to an amplifier 121 and may receive its signal from the processing unit 100 through a digital-to-analog converter 120. Output can also be made via the Bluetooth transceiver 102 with a Bluetooth antenna 103 to a remote Bluetooth device such as a personal navigation device 170 with a Bluetooth antenna 172. Communication with a personal navigation device can also be achieved via USB connectors 123 and 171. The telematics system may further include a vehicle navigation device 134, which may interact with the GPS unit 133 and/or a mobile network 160 via a base station 150 and a multi-band antenna 110 or a mobile terminal 111. The mobile terminal 111 may be a cell phone, smart phone, PDA, or the like and may be connected to the processing unit 100 either directly, via a USB connector 123, or via the Bluetooth transceiver 102 with its antenna 103. The multi-band antenna 110 may exchange data with the processing unit 100 either through a wire or wirelessly through a modem 101. Here, the base station 150 and the network 160 are not part of the telematics system but provided outside the vehicle. In some examples, the base station 150 may be a WiFi access point.

Data may be communicated between the central processing unit 100 and the network 160 utilizing, for instance, a data-plan, data over voice, or DTMF tones associated with the mobile terminal. Both multi-band antenna 110 and the mobile terminal 111 may exchange data bi-directionally with the base station or WiFi access point 150. The modem 101 may also communicate directly with a network 160 through communications with a cellular tower 150. As a non-limiting example, the modem 101 may be a USB cellular modem and the communication may be cellular communication.

In one example, the processing unit 100 may be provided with an operating system including an API to communicate with modem application software. The modem application software may access an embedded module or firmware on the Bluetooth transceiver 102 to complete wireless communication with a remote Bluetooth transceiver (such as that of the mobile terminal 111). In another example, the mobile terminal 111 may include a modem for voice band or broadband data communication. If the user has a data-plan associated with the mobile terminal 111, it may be possible that the data-plan allows for broadband transmission and the telematics system could use a much wider bandwidth (speeding up data transfer). In still another example, the mobile terminal 111 may be replaced with a cellular communication device (e.g., and without limitation, a modem 101), that may be installed in the vehicle. In yet another, the mobile terminal 111 may be replaced with a wireless local area network (LAN) device capable of communication over, for example, an 802.11g network (e.g., WiFi) or a WiMax network. In one example, incoming data may be passed through the mobile terminal 111 via a data-over-voice or data-plan, through the on-board Bluetooth transceiver 102 and into the central processing unit 100.

Data, whether incoming, outgoing, or temporary, may be stored on the HDD 140 or in the RAM 140 or any other storage media until a designated time or a period of non-use. The HDD 140 or other storage media may be used as the memory for storing generated log files until the reporter component transmits them to an external analyzer component. This transfer to an external analyzer component may be performed via the modem 101, the multi-band antenna 110, the Bluetooth transceiver 102, or the mobile terminal 111, e.g., to a mobile network 160 or a wireless network.

The central processing unit may further be in communication with a variety of other auxiliary devices 180. These devices may be connected through wireless 182 or wired 181 connections (such as a USB connection). Also, or alternatively, the CPU 100 may be connected to a vehicle based wireless router 106, using for example a WiFi transceiver 107. This could allow the CPU to connect to remote networks in range of the local router 106.

The processing unit 100 may further interact with a radio, a CD player, or a DVD player 143 to provide audio and/or video to the stereo system 122 and/or a video display 142. Audio and/or video may also be provided via the multi-band antenna 110 or the mobile terminal 111 from a mobile network 160, wireless network, or digital broadcast network 161 (Digital Audio Broadcast, Digital Video Broadcast) via a broadcast transmitter 151 outside the vehicle. Audio and video data may be downloaded or streamed through the connections. In the case of a download, the data may be temporarily or persistently stored in the HDD 140 or other storage device. A further processing unit 141 may later read the stored data from the HDD 140 and provide video and/or audio service through the vehicle's speaker system 122 or a video display 142.

The processing unit 100 may further interact with a microphone 131 and the vehicle's speaker system 122 to provide hands-free telephony, e.g., via the mobile terminal 111. Similarly the processing unit 100 may interact with the mobile terminal 111 and vehicle diagnostics (not shown) to send an emergency call or a breakdown call.

The processing unit 100 may also interact with an engine control unit (ECU) 144 to control engine parameters or monitor the vehicle's engine. Similarly, the processing unit 100 may interact with a powertrain control module (PCM) 144 and a series of sensor systems 145, like for instance but without limitation, a tire pressure monitoring system, a road condition sensor, a parking sensor, a temperature sensor, an ambient light sensor, and the like. Wired communications within the automotive telematics system may be carried out using MOST (Media Oriented Systems Transport), CAN (Controller Area Network), IEEE 1394, or other technologies. Interaction of the processing unit with the ECU or PCM with respect to EOBD (European On-Board Diagnostics) or OBD-II (On-Board Diagnostics-II) regulations may be included as well as components of an automotive telematics system, which provide a group of infotainment and/or vehicle safety services, as described in the following.

Figure 2:
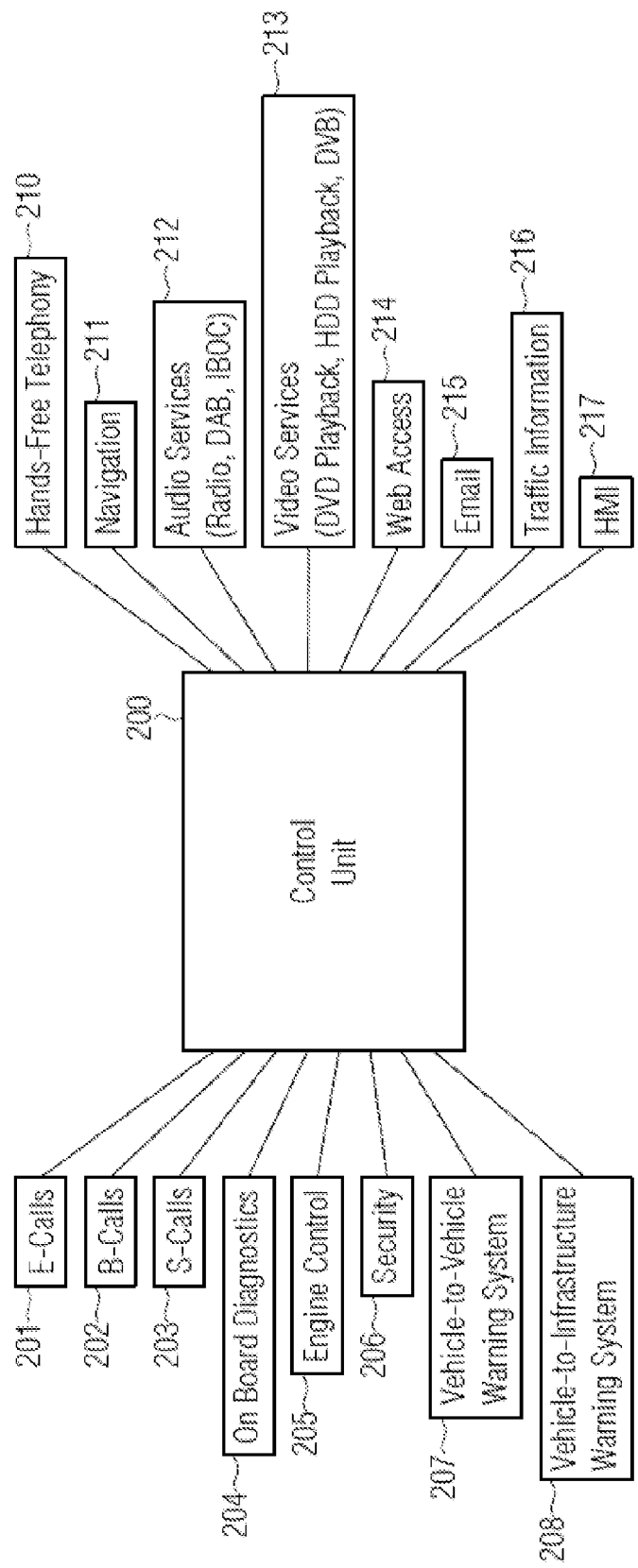
FIG. 2 shows an example list of services provided by application components in an automotive telematics system.

FIG. 2 shows as an illustrative, but non-limiting example, a list of services provided by application components in an automotive telematics system. In this figure, the corresponding application components may be implemented and run on one control unit 200. However, it should be understood that each of the listed service may be provided by more than one application component or by an entire chain of application components, where each application component can interact with one or more automotive telematics components. The involved application components may be implemented in a central processing unit 100 or in a processing unit 200 assigned to a telematics component. Services from the group of vehicle safety services 201-208 and/or infotainment services 210-217 may be provided.

An application component may send an emergency call 201 similar to a Call-911, as defined by a standard of the European Commission, for instance, via a mobile terminal 111 or a modem 101 and a multi-band antenna 110, if it receives signals from appropriate sensors 145 of the vehicle, e.g., reporting an impact of a pre-determined strength, indicating that a (serious) car accident has occurred. The involved telematics components and the processing unit 100 may dispose of a back-up battery system independent of the vehicle's battery in order to be able to dispatch the emergency call even if the integrity of major parts of the vehicle has been compromised during the accident. The telematics system and method provides a way of logging and diagnosing potential problems that may have occurred with the dispatching of such an emergency call. For the given service, the logging messages received and processed into a log file by the logger component may include logging messages from the sensors which may trigger the dispatching of an emergency call by triggering the execution of the corresponding application component on the processing unit, or may be limited to the logging messages related to the actual dispatching of the call, e.g., transmitted from the involved telematics components like the modem 101 and the multi-band antenna 110.

Similarly, an application component may send a breakdown call 202 via a mobile terminal 111 or a modem 101 and a multi-band antenna 110 to a retailer, car shop, or an automobile association, upon detection of a vehicle breakdown, e.g., via corresponding signals from the ECU or PCM component. Finally, an application component may send a service call 203 via a mobile terminal 111 or a modem 101 and a multi-band antenna 110 to a retailer or car shop for informing a mechanic about a request for additional servicing of the vehicle outside the regular servicing plan upon detection of a non-critical problem of one or several components of the vehicle, e.g., a malfunction of outside mirror heaters. Depending on the urgency of the occurred problem, a mechanic may decide whether to call the vehicle in for servicing or defer correction of the problem to the next regular servicing. Emergency calls, breakdown calls, and service calls may also be provided by the same application component upon reception of different trigger signals.

A further application component may provide security services 206, for instance by interacting with the locking system of the car. The application component may for instance unlock previously locked vehicle doors, as it may be normal in some vehicles while driving, upon detection of an accident of the vehicle. Also, doors may be automatically locked by the application component after passengers have left the vehicle.

A further application component may provide vehicle-to-vehicle warnings 207 and/or vehicle-to-infrastructure warnings 208. Such warnings may include warnings about road or traffic conditions, like road freeze-over, traffic jams, car accidents, and so on, and may be exchanged directly between vehicles, e.g., via the wireless router 106 and its short-range antenna 107 or the modem 101, or between the vehicle and a corresponding infrastructure, e.g., via the multi-band antenna 110 or a mobile terminal 111. The corresponding infrastructure may be part of a mobile network 160 and/or involve a digital broadcasting network 161. The service may further be provided in interaction with a GPS unit 133 and/or a vehicle navigation device 134. An example chain may include the application component receiving a warning from a traffic network 160 via a base station 150 and the mobile terminal 111, relaying the warning to a following vehicle via the wireless router 106 and its antenna 107, receiving GPS information from the GPS unit 133, and requesting the vehicle navigation device 134 to suggest an alternative route to destination. Using the system, the application component may report errors occurred in any of the involved telematics components or application components, e.g., a travelling salesman solver of the vehicle navigation device, to the logger component for storage and/or transmission to an external analyzer component.

For completeness only, a further application component may provide on-board diagnostics services 204 diagnosing and reporting hardware malfunctions of components of the vehicle, including telematics components, e.g., brakes, lights, etc., which may serve as the basis for triggering the dispatching of a service call. Similarly, an application component may monitor and diagnose the vehicle's engine 205 through an engine control unit and report problems to the logger component for immediate or later analysis.

The system may further provide a series of infotainment services, as described in the following.

An application component may provide hands-free telephony 210 in interaction with a microphone 131 and A/D converter 130 and the vehicle's stereo system, including speakers 122, an amplifier 121, and D/A converter 120, as well as a mobile terminal 111. The provided service may involve further application components, like for instance a speech recognition component or application components controlling a volume of the radio and/or display devices.

A further application component may provide on-board navigation services 211 in interaction with the GPS unit 133, the vehicle navigation device 134 or a personal navigation device 170, as well as the modem 101 and the multi-band antenna 110.

Further application components may provide audio services 212, such as AM/FM radio reception, In-Band On-Channel (IBOC) radio reception, or digital audio broadcast radio, and/or video services 213 such as DVD/CD playback, HDD playback, or digital video broadcast services. Depending on the service, the mobile terminal 111 or the multi-band antenna 110 may receive data from a base station 150 or a broadcast transmitter 151. The playback of a video stored on a HDD 140 may also involve a further processing unit 141 and a further (rear) video display 142, where the further processing unit 141 handles most of the processing for displaying a movie, while the application component on the central processing unit 100 monitors the success of the service, or the further processing unit 141 may even implement the application component itself, such that a logging message from the application component may be transmitted to the central processing unit, where the logger component may be implemented.

As further service, an application component may provide web access 214 and/or email access 215, e.g., in interaction with the modem 101 and the multi-band antenna 110, the wireless router 106, or the mobile terminal 111. Through the mobile terminal 111 and/or the multi-band antenna 110, a further application may receive traffic information 216 from a network 160, and propose a different route in interaction with a vehicle navigation device 134 and the GPS unit 133.

Finally, an application component may provide services relying on HMI (Human-Machine Interaction) 217 like a touch sensitive screen, a mouse, a control stick, or trackball to play games for instance, or browse through the monitoring system of the vehicle, to interact with the vehicle navigation device 134 or to operate a media station of the vehicle.

A nearly infinite number of services, which may be provided by an application component implemented in a processing unit in interaction with one or more telematics components, may be possible and the system is not limited to the described examples but may be applied to any telematics system-based service. As long as the corresponding components, both application components and telematics components, may be adapted to provide logging messages to a controlling application component, which transmits its state in the form of a logging message to a logger component, the system and method may be applied to the entire service chain. Even if the controlling application component is adapted to transmit its state as a logging message, the system may still be carried out, however, with a lower level of detail with respect to possible fault root causes.

Figure 3:
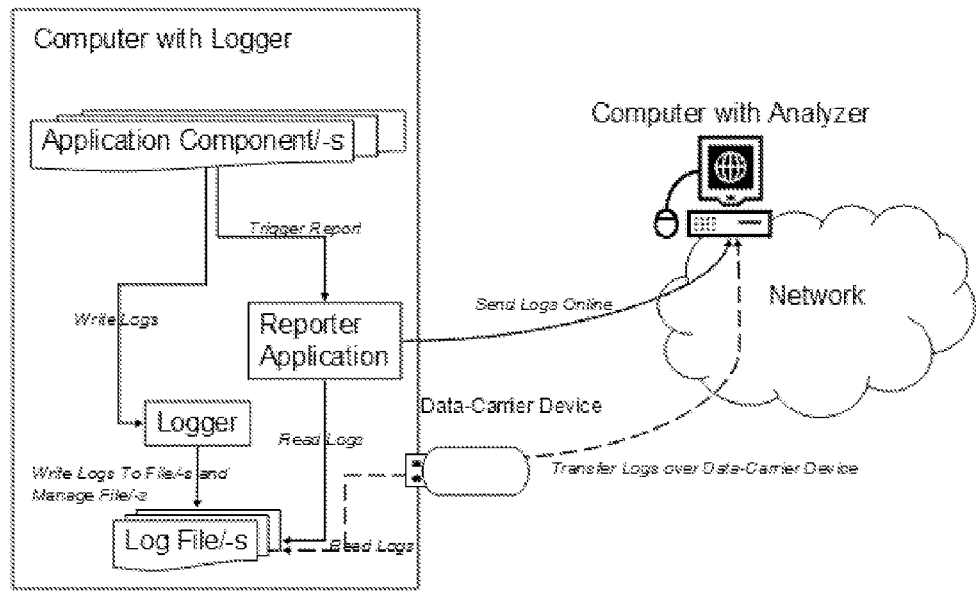
FIG. 3 shows an example diagnostics system architecture.

FIG. 3 shows an example of the logging and diagnostics system architecture. In one example, application components, the logger component, the reporter component, and the log files may be implemented in one computer system installed in the vehicle. However, each component may also be independently implemented in a different computer system installed in the vehicle. The application components transmit their states as logging messages to the logger component that may write the logging messages in ordered and compact form into log files. The reporter component may be prompted by any application component and/or from outside the vehicle, e.g., by an analyzer component, to read a log file and deliver the logging data to a back-end analyzer component. Furthermore, the same logging data may be transferred between the computer system with the logger component and the analyzer component by other means of data transfer, e.g., via a USB data stick. The analyzer component may provide means for an automated analysis of the logging data.

Two examples for possible implementations of a standard frame format for the logging messages are given. The first implementation exhibits a fixed number of parameters including 4 bytes each as the metadata.

TABLE 2

Simple packed binary logging format

| Timestamp | Component ID | Signal ID | Parameter 1 | Parameter 2 | Parameter 3 |
|---|---|---|---|---|---|
| 4 bytes | 1 byte | 1 byte | 4 bytes | 4 bytes | 4 bytes |

The second implementation exhibits variable-size parameter metadata that may be mapped to any message-data structure (such as a C++ structure).

TABLE 3

Advanced binary logging format

| Timestamp | Component ID | Signal ID | Data size | Data content |
|---|---|---|---|---|
| 4 bytes | 1 byte | 1 byte | 1 byte | 0 to 255 bytes (variable) |

In order to allow for a regulated future expansion of the system, it may be useful to restrict the signal and component IDs not to assume the entire range of values. For instance, in a reference implementation, the values 0xFF are reserved for both component and signal IDs for future use.

Figure 4:
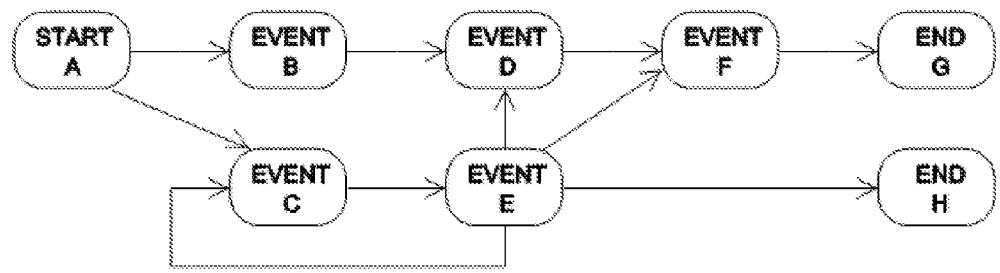
FIG. 4 shows an example of a state flow diagram of a use case.

FIG. 4 shows an example of a state flow diagram of a use case. The START states of a use case must not contain any incoming edges in order to uniquely define the use case entry point. For simplicity, the log signals that are associated with a state are indicated by letters A to H. The logging messages composing the states of a use case may be distributed arbitrarily among multiple system components, both application components and telematics components. In order to avoid a large number of arrows in the case of an END state that could be reached from many other states (such as an abort), it may be possible to define END states without incoming paths. These END states indicate that they may be reached by any previous START or EVENT state.

To allow for rapid definition of use cases, a template may be provided containing the building blocks of a use case. The template may contain the different available states, state parameters, component and component ID definition tags, and an overall description field template.

Figure 5:
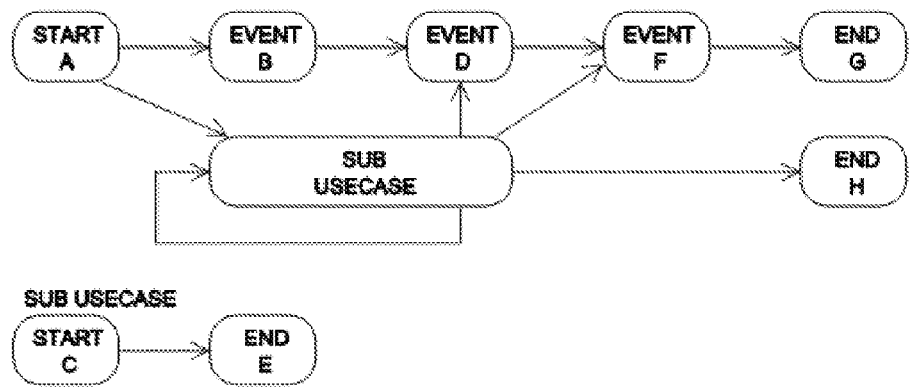
FIG. 5 shows an example state flow diagram of a use case, involving a sub-use case.

FIG. 5 shows an example of a state flow diagram of a use case, involving a sub-use case. The state flow diagram may be equivalent to the state flow diagram depicted in FIG. 4, where the body of the loop, events C and E, has been re-defined as a sub-use case that may be used in state flow diagrams of other use cases.

In order to assess whether a use case has been completed successfully, the end states may be considered. Additionally, any state of the use case graph may set a status flag that can assume values such as OK, WARNING, or ERROR. The status flag may be carried forward from state to state up to the end of the use case. This permits a fast assessment whether any problem occurred during execution of the use case. For instance, state E of the sub-use case of FIG. 5 could indicate that a non-critical problem has occurred, and set the status flag to WARNING. When the main use case END state G may be reached, this information would be available and allow marking the use case for manual in-depth analysis, even if the final state G indicated a successful completion of the use case. The status marker may also be cleared. This may be important in the case of a successful handling of a problem that is anticipated by the use case.

Figure 6:
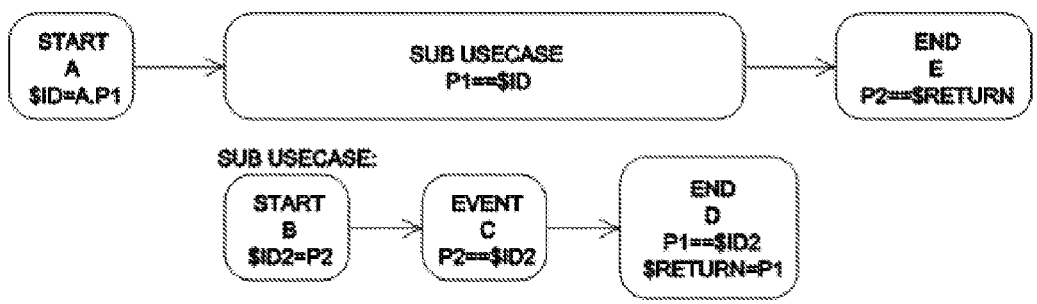
FIG. 6 shows an example for state flow tracking using variables.

FIG. 6 shows an example of multi-instance use case tracking including sub-use cases using variables. Consider the following sequence of logging messages A-E with parameters P1 and P2, where A-E are uniquely defined by their component IDs and message IDs and P1 and P2 are used as IDs that are written out at logging time into the metadata of the corresponding logging messages. With the correct, matching use case definition employing variables as illustrated in FIG. 6, the two concurrent instances may be automatically identified by assigning at least one value of the parameter P1 or P2 to a corresponding variable when matching a logging message to a state and comparing at least one value of the parameter P1 or P2 with the corresponding variable when matching a further logging message to a further state. The figure indicates the assignment of parameters to the variables $ID and $ID2 (:=symbols), the condition to be met to match a state to the message (==symbols), and passing of a variable from a sub-use case to its parent use case through $RETURN. The variables used in a use case definition may be of global type. The values of the parameters A.P1, P1, and P2 in the figure may be extracted from the parameters included in the metadata of each logging message, if available.

TABLE 4

Message sequence

| Message | A | A | B | B | C | C | D | D | E | E |
|---|---|---|---|---|---|---|---|---|---|---|
| P1 | 1 | 2 | 1 | 2 | — | — | 3 | 4 | — | — |
| P2 | — | — | 3 | 4 | 4 | 3 | — | — | 3 | 4 |

The table shows an example of a sequence of logging messages together with their values for the parameters P1 and P2 in a multi-instance situation. In such a case, the analyzer component will receive such an unordered list (with respect to the instance of the corresponding use case) and will attempt to identify each instance of the use case by matching the value of at least one parameter included in the metadata of at least one logging message to at least one variable of the use case. Two instances (1) and (2) may be initialized by matching the first two logging messages in the table to the START state of the predefined use case. When entering the sub-use case, the analyzer component identifies the instance of each logging message B by matching the value of parameter P1 included in the metadata of the current logging message to the value stored in the variable $ID during the initialization step when matching the START state. A similar matching occurs with of the following states such that the analyzer component can successfully assign each extracted logging message to the correct instance of the use case. As an example, the logging message (C, -, 4) a reference to the second instance (2) may be extracted first from the log file, but through matching P2 with $ID2, the analyzer component may be able to identify the correct instance (2) of the use case.

The two concurrent use case instances may be uniquely identified by the following sequences of logging messages, including parameters P1 and P2:

(A, 1, -), (B, 1, 3), (C, -, 3), (D, 3, -), (E, -, 3)
(A, 2, -), (B, 2, 4), (C, -, 4), (D, 4, -), (E, -, 4)

Prior to performing an actual log file analysis, the syntax of a use case diagram may be checked for correctness. This may include, for instance, that a valid use case must have at least one START state, at least one END state, zero or more EVENT states, references to zero or more SUB_USECASEs (that exist), a well-defined use case graph, correct variable declarations and usage, and so on. The validation may include a comparison of the available signal IDs stored in memory with those signal IDs associated with the use case states. Each signal must have a corresponding use case state. Otherwise, these signals may be flagged as unused log messages. The syntax check may be carried out automatically when a use case may be defined, e.g., by use of a graphical tool. The syntax check may also be carried out by validating an XML instance describing the use case against its XML schema. In this case, the XML schema may include the definitions of available logging messages, parameters, and variables, with or without constraining their relations.

During an automatic processing of a log file, the analyzer may attempt to identify as many of the predefined use cases as possible. For each use case, multiple flow paths may exist as soon as a state has more than one following states. Even if a logging message matching a state in one of the branches was found in the log file that may be analyzed, the analyzer component may still attempt to follow through the path of the other branches. For example, in the use case of FIG. 5, the two states in the top branch B, D, may occur first in the log file. Then, the sub-use case in the right branch may occur, following state A. Handling many branches may correctly track use cases where multiple flow paths are active in parallel that may or may not be dependent on each other, and that cannot be placed in sequence by the modeler. Also, while the arrows specify the ordering of states inside of a flow path, there is no ordering between states in different paths other than that they must occur after the state where the branching-off has occurred.

For each state that has more than one following state, a new flow path may be examined. The use case may be considered completely analyzed once flow paths have been searched for events. Furthermore, it may be desirable that the last line recorded for a use case may be the END state. Therefore, once a use case has no following state other than the END state, the other branches may be examined prior to processing the logging message corresponding to the END state.

Figure 7:
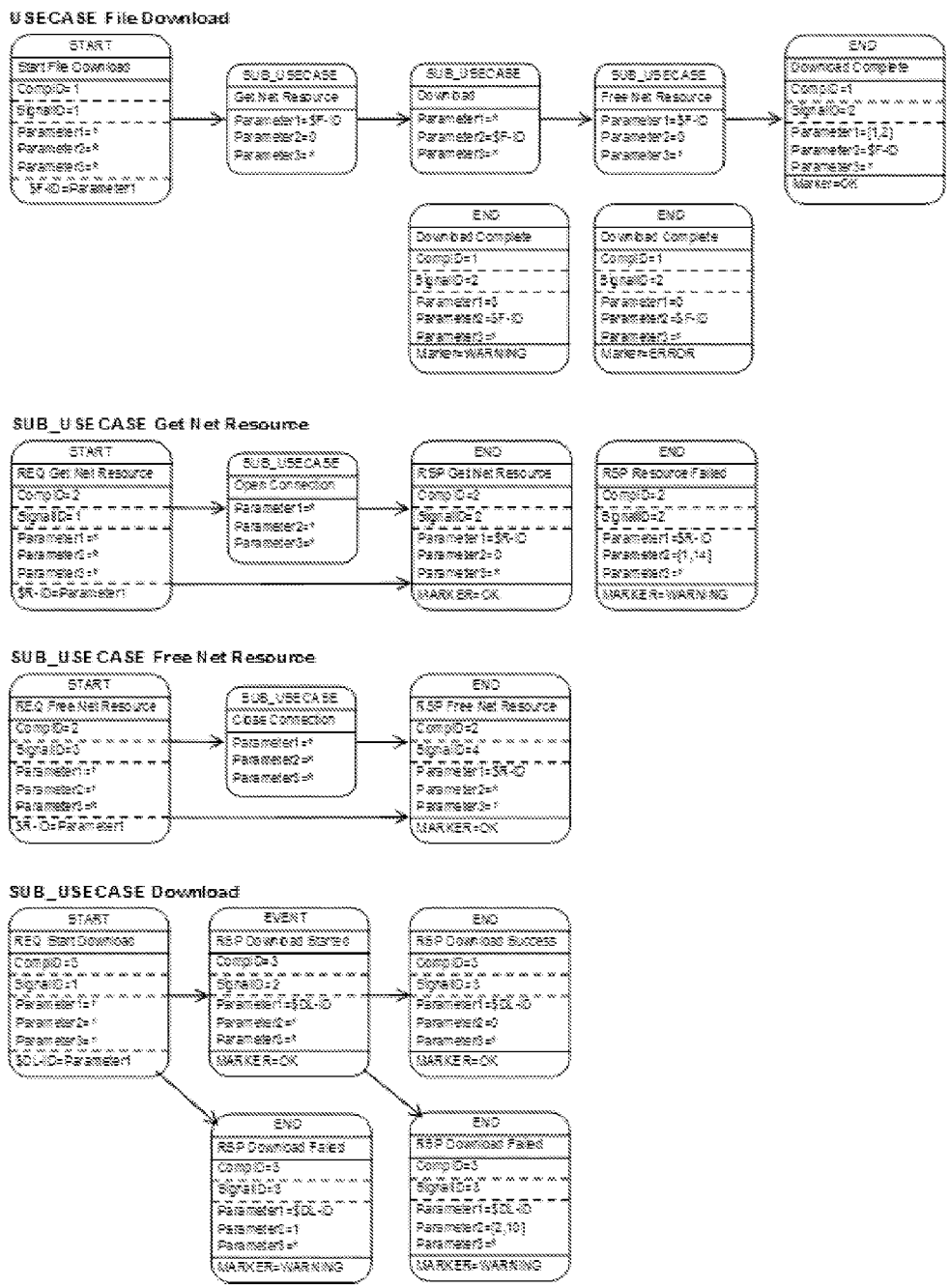
FIG. 7 shows an example manifestation of a predefined use case for a file download including sub-use cases for network resource reservation and freeing.

An actual manifestation of a telematics use case is depicted in FIG. 7. It defines the use case of downloading a file from a back-end server. The sub-use cases for reserving and freeing of network access resources may be included, as well as the actual download sub-use case. FIG. 7 also illustrates the tracking of use cases via variables for the identification of a use case instance. The matching of parameters and variables as well as parameters and values/value ranges follows the criteria defined in Table 1. The correct instance of the "getting of network resource" sub-use case is identified by referencing the identifier of the file ($F-ID) in the sub-use case call ($R-ID). The value of this variable may be matched to the corresponding parameter from the metadata of the corresponding logging message of the sub-use case start state. In the download sub-use case, the $DL-ID variable may be used to again extract the download identifier value from the first message parameter, and allows to correctly identify the instance of the corresponding END state. Further, the technique of defining end states that have no incoming paths is illustrated, indicating that they may be reached from any other non-end state.

An example for a possible log file content for the presented manifestation of FIG. 7 is presented whereby two concurrent file downloads may be considered. Here, the first download fails. The analyzer component correctly tracks both instances due to the conclusive use case definitions of FIG. 7.

TABLE 5

Example for message sequence with two concurrent file downloads

| Message | Comp ID | Signal ID | P1 | P2 |
|---|---|---|---|---|
| Start File Download | 1 | 1 | 5 | — |
| REQ Get Net Resource | 2 | 1 | 5 | — |
| RSP Get Net Resource | 2 | 1 | 5 | 0 |
| Start File Download | 1 | 1 | 9 | — |
| REQ Get Net Resource | 2 | 1 | 9 | — |
| RSP Get Net Resource | 2 | 1 | 9 | 0 |
| REQ Start Download | 3 | 1 | 1 | 5 |
| REQ Start Download | 3 | 1 | 2 | 9 |
| RSP Download Started | 3 | 2 | 2 | — |
| RSP Download Success | 3 | 3 | 2 | 0 |
| REQ Free Net Resource | 2 | 3 | 9 | — |
| RSP Free Net Resource | 2 | 4 | 9 | — |
| Download Complete | 1 | 2 | 9 | 1 |
| RSP Download Failed | 3 | 1 | 1 | 1 |
| REQ Free Net Resource | 2 | 3 | 5 | 0 |
| RSP Free Net Resource | 2 | 4 | 5 | — |
| Download Complete | 1 | 2 | 5 | 0 |

The two concurrent use case instances may be uniquely identified as:
First download (failed) (Final marker state ERROR)
Second download (success) (Final marker state OK)

In the following, an example format of a multi-level dictionary including a top-level description file containing global message filters and import statements for component-translation files may be described. The relevant component IDs may be defined in the top-level file as well in order to avoid any conflicts.

```
// definition of components
// #import <component ID>, <component name>, <component- filename>
#import 0, "ROOT_COMPONENT", "Translation_RootComponent.txt"
#import 1, "SUB_COMPONENT_1", "Translation_SubComponent1.txt"
#import 2, "SUB_COMPONENT_2", "Translation_SubComponent2.txt"
#import 3, "SUB_COMPONENT_3", "Translation_SubComponent3.txt"
...
// definition of global filter
// There are max 256 global filters.
// #define <global filter>, <filter text>
#define ERROR,         "Error"
```

```
#define WARNING,    "Warning"
#define INFO,       "Info"
#define DEBUG,      "Debug"
...
```

The component-level translation files assign textual messages to the corresponding signal IDs. The textual messages may include placeholders to insert interpreted content from the message metadata field of each message frame. The adopted format of the component-level translation files may be provided.

```
// definition of component- messages
// <signal_ID>, <global filter>, <message translation>
1, INFO, "An info message"
2, ERROR, "An error message, error reason %d"
3, INFO, "A warning message, server state: %d, mode: %u, char: %c"
...
```

For the simple binary logging format of Table 2, the placeholders are defined in Table 6. This determines how the binary metadata (parameters 1-3) will be interpreted. C-Style enumerations may be defined and used to translate integers into a more readable format.

TABLE 6

Definition of placeholders

| Placeholder | Parameter type | Output example |
|---|---|---|
| %d | 32 bit signed integer | −50 |
| %u | 32 bit unsigned integer | 100 |
| %x | 32 bit unsigned hexadecimal integer | 0x00aa55cc |
| %c | 4 ASCII characters | Abcd |
| %<Name> | C-Style enumeration | STATUS_OK |

An example of an enumeration definition and usage in the component-translation file is given:

```
001, INFO, "Component started with Trigger %TriggerType"
002, INFO, "Component connected is %Bool"
003, INFO, "Component disconnected is %Bool"
// Enum definition to translate metadata parameter values
enum TriggerType {
    CLIENT_REQUEST = 0,
    SERVER_REQUEST = 1,
    TIMER   = 2
};
enum Bool {
    FALSE = 0,
    TRUE = 1
};
```

The multi-level dictionary may also be provided in the form of a Python dictionary or a Perl hash.

Described herein are various types of components described as software or hardware components. It is to be understood that each of these described components may be hardware and/or software components. Furthermore, in the case of software components or components that may be at least partially software, such components or software aspects may be stored in a memory device and executable by a processor.

For example, the system may include a processing unit and a memory device, where the processing unit and the memory device may be configured to be installed in a vehicle, ship, or other mode of transport of people, such an automobile. The memory device may include instructions including, a logger component, a telematics component, and an application component. The application component may be executable by the processing unit to: provide a service of the telematics component; and communicate an error state of the application component as a logging message to the logger component. The logger component may be executable by the processing unit to generate a log file based on the logging message. The logging message may include a component identifier for the application component, an error message identifier describing the error state of the application component, and metadata including a parameter.

The memory device may be configured to store the log file, and the memory device further include a reporter component executable by the processing unit to communicate the log file to an analyzer component. The reporter component may be further configured to communicate the log file to the analyzer component after a predetermined time period. Also, the analyzer component may executable by the processing unit or by a processing unit external to the vehicle, ship, or other mode of transport of people. The reporter component may be further executable by the processing unit to: receive data including definitions of errors; and communicate at least the definitions of errors to the application component. The definitions of errors may facilitate identification of error states of the application component. The analyzer component may be further executable by the processing unit to carry out a fault root cause analysis based on the log file and a predefined use case.

The processing unit may be configured to execute and manage a multi-threaded system adapted to execute concurrent instances of the application component. In such a case, the processing unit may also carry out a fault root cause analysis based on the log file and a predefined use case. A state of the predefined use case may include a use case variable, and the processing unit may identify an instance of the predefined use case by matching the parameter included in the metadata of the logging message to the use case variable.

In another example, a processor in a head unit may identify a plurality of predefined use cases associated with an application component of a telematics system. The processor may also identify a logging message from a log file associated with the application component. Further, the processor may identify a predefined use case from the plurality of predefined use cases by matching the logging message to an error state of the predefined use case. The predefined use case may include a plurality of states and relationships provided in a state flow diagram.

The processor may also manage a multi-threaded system executing concurrent instances of the application component. In such an example, the processor may also carrying out a fault root cause analysis based on the log file and the predefined use case. A state of the predefined use case may include a use case variable, the processor may identify an instance of the predefined use case by matching a parameter included in metadata of the logging message to the use case variable.

The processor may also communicate, via the application component, an error state of the application component to a logger component upon reception of a predefined trigger signal, and the predefined trigger signal may be communicated from the logger component.

In another example, a processor installed in a vehicle, ship, or other mode of transport of people, may identify an error state of a telematics application providing a telematics service. Such a processor may also communicate the error state to a logger application via a logging message and generate, via the logger application, a log file based on the logging message. In such an example the logging message may include an identifier associated with the telematics application, a message identifier associated with the logging message, and metadata including a parameter and a timestamp.

The processor may also communicate the log file to an analyzer application. The analyzer application may carrying out an automatic fault root cause analysis by analyzing the log file based on a predefined use case. The processor may also identify a logging message from the log file and a predefined use case from a plurality of predefined use cases by matching the logging message to an error state in the predefined use case. The predefined use case may be defined as a plurality of states and relationships organized in a graph data structure. The processor may also analyze the predefined use case, and a display device may display the analysis of the predefined use case. The display device may be installed the vehicle, ship, or other mode of transport of people.

Furthermore, while various examples of the invention have been described, it will be apparent to those of ordinary skill in the art that many more examples and implementations are possible within the scope of the invention. Accordingly, the invention is not to be restricted except in light of the attached claims and their equivalents.

We claim:

1. A system, comprising:
   a processing unit;
   a logger component;
   a telematics component;
   an application component executable by the processing unit to:
      provide a service of the telematics component; and
      communicate an error state of the application component as a logging message to the logger component, where the logger component is executable by the processing unit to generate a log file based on the logging message, where the processing unit, the logger component, the telematics component, and the application component are configured to be installed in a vehicle, ship, or other mode of transport of people; wherein the logging message comprises:
         a component identifier for the at least one application component,
         a message identifier describing a transmitted state of the at least one application component; and
         metadata comprising a parameter; and
   a reporter component executable by the processing unit to communicate the log file to an analyzer component, where the analyzer component is further executable to carry out a fault root cause analysis based on the log file and a predefined use case.

2. The system according to claim 1, where a memory device is coupled to the processing unit and is configured to store the log file.

3. The system according to claim 2, where the reporter component is further configured to communicate the log file to the analyzer component after a predetermined time period.

4. The system according to claim 2, where the analyzer component is executable by the processing unit.

5. The system according to claim 2, where the analyzer component is executable by a processing unit external to the vehicle.

6. The system according to claim 2, where the reporter component is further executable by the processing unit to:
   receive data comprising definitions of errors; and
   communicate at least the definitions of errors to the application component.

7. The system according to claim 6, where the definitions of errors facilitate identification of error states of the application component.

8. The system according to claim 1, where the processing unit is configured to:
   execute and manage a multi-threaded system adapted to execute concurrent instances of the application component;
   carry out a fault root cause analysis based on the log file and a predefined use case, where a state of the predefined use case comprises a use case variable; and
   identify an instance of the predefined use case by matching the parameter comprised in the metadata of the logging message to the use case variable.

9. A method, comprising:
   identifying, by a processor configured to be installed in a vehicle, ship, or other mode of transport of people, an error state of a telematics component providing a telematics service;
   communicating, by the processor, the error state to a logger component via a logging message;
   generating, by the logger component, a log file based on the logging message, wherein the logging message comprises:
      a component identifier for at least one application component,
      a message identifier describing a transmitted state of the at least one application component, and
      metadata comprising a parameter and a timestamp;
   communicating, by the processor, the log file to an analyzer component; and
   carrying out, by the analyzer component, an automatic fault root cause analysis by analyzing the log file based on a predefined use case.

10. The method according to claim 9, further comprising:
    identifying, by the processor, the logging message from the log file; and
    identifying, by the processor, a predefined use case from a plurality of predefined use cases by matching the logging message to an error state in the predefined use case, where the predefined use case is defined as a plurality of states and relationships organized in a graph data structure.

11. The method according to claim 10, further comprising analyzing, by the processor, the predefined use case.

12. The method according to claim 11, further comprising displaying the analysis of the predefined use case by a display device installed in the vehicle, ship, or other mode of transport of people.

* * * * *